(12) United States Patent
Lee et al.

(10) Patent No.: US 12,179,341 B2
(45) Date of Patent: Dec. 31, 2024

(54) SIMULATION MANIPULATOR

(71) Applicant: Google LLC, Mountain View, CA (US)

(72) Inventors: Chihhao Lee, New Taipei (TW); Hsu Chung, New Taipei (TW); Yenming Liu, New Taipei (TW); Lin Chi Lin, Taipei (TW); Hung-Ren Yu, New Taipei (TW); Chen Chao Huang, Taoyuan (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/362,593

(22) Filed: Jul. 31, 2023

(65) Prior Publication Data
US 2023/0373106 A1    Nov. 23, 2023

Related U.S. Application Data

(60) Provisional application No. 63/516,405, filed on Jul. 28, 2023.

(51) Int. Cl.
*B25J 15/08*    (2006.01)
*B25J 11/00*    (2006.01)
*B33Y 80/00*    (2015.01)

(52) U.S. Cl.
CPC .............. *B25J 15/08* (2013.01); *B25J 11/00* (2013.01); *B33Y 80/00* (2014.12)

(58) Field of Classification Search
None
See application file for complete search history.

(56) References Cited

U.S. PATENT DOCUMENTS

| | | | |
|---|---|---|---|
| 2014/0236314 A1 | 8/2014 | Van Wiemeersch | |
| 2016/0337053 A1 | 11/2016 | Diperna et al. | |
| 2018/0180645 A1 | 6/2018 | Fenton et al. | |
| 2020/0376674 A1* | 12/2020 | Tomioka | B25J 13/084 |

FOREIGN PATENT DOCUMENTS

WO    2015200025    12/2015

OTHER PUBLICATIONS

Cowan, Marissa, "Conductive Finger for a Prosthetic Hand", Dec. 2021, 31 pages.
Zapciu, et al., "Adaptive Manufacturing Integration of Thermoplastic Conductive Materials in Intelligent Robotic End Effector Systems", Dec. 2016, 6 pages.

* cited by examiner

*Primary Examiner* — Vicky A Johnson
(74) *Attorney, Agent, or Firm* — Colby Nipper PLLC (57) ABSTRACT

This document describes systems and techniques for simulating the touch of a human finger in manipulating an interface device, such as a touchscreen included in a mobile phone or other computing device. The systems and techniques include an artificial finger configured to be received and manipulated by a robotic actuator to simulate surface engagement, mechanical force, and electrical conductivity of a human finger engaging the touchscreen at varied touch angles and/or mechanical pressures. The systems and techniques thereby provide for rigorous and repeatable testing of an electrical and mechanical response of the touchscreen to simulated user inputs without involving a human test operator.

10 Claims, 6 Drawing Sheets

Forming a rigid central member of an artificial finger extending in a first direction and curving the rigid central member in a transverse direction to approximate phalanges of an extended human finger
602

Forming a compressible outer layer disposable around at least a portion of the rigid central member and shaped to approximate a form of the extended human finger
604

Disposing a conductive element at least partially covering a distal end of the artificial finger
606

Mounting the rigid central member and the compressible outer layer on a coupling configured to be received by a robotic actuator by mechanically coupling the rigid central member to the coupling receivable by the robotic actuator and electrically coupling the conductive layer to a surface of the coupling configured to be in electrical communication with the robotic actuator when the coupling is received by the robotic actuator
608

*FIG. 6*

SIMULATION MANIPULATOR

CROSS-REFERENCE TO RELATED APPLICATION

This application claims priority to U.S. Provisional Application Ser. No. 63/516,405, filed on Jul. 28, 2023, the disclosure of which is incorporated herein by reference in its entirety.

SUMMARY

This document describes systems and techniques for simulating the touch of a human finger in manipulating an interface device, such as a touchscreen included in a mobile phone or other computing device. The systems and techniques include an artificial finger configured to be received and manipulated by a robotic actuator to simulate surface engagement, mechanical force, and electrical conductivity of a human finger engaging the touchscreen at varied touch angles and/or mechanical pressures. The systems and techniques thereby provide for rigorous and repeatable testing of an electrical and mechanical response of the touchscreen to simulated user inputs without involving a human test operator.

For example, an apparatus is described that comprises an artificial finger including a rigid central member extending in a first direction and including a curvature transverse to the first direction to approximate phalanges of an extended human finger. A compressible outer layer is disposed around at least a portion of the rigid central member and is shaped to approximate a form of the extended human finger, and includes a conductive element spanning at least a distal pad and a tip of the artificial finger. A coupling is joined with the artificial finger and is configured to be received by a robotic actuator to enable the robotic actuator to mechanically manipulate the artificial finger and to electrically couple the conductive element with a conductive portion of the robotic actuator. For another example, a method is disclosed that comprises forming previously the apparatus as previously described.

This Summary is provided to introduce systems and techniques for providing a simulation manipulator that includes an artificial finger that may be used to test an interface, as further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of systems and techniques for simulating the touch of a human finger in manipulating an interface device, such as a touchscreen, are described in this document with reference to the following drawings. The same numbers are used throughout the drawings to reference like features and components.

DETAILED DESCRIPTION

Overview

Touchscreens and other interfaces are important usability features of mobile telephones and other devices. The touchscreen of a mobile telephone, for example, is a device that potentially may be engaged by a user thousands of times in a single day and/or millions of times during the life of the mobile telephone that incorporates the touchscreen. Accordingly, in seeking to ensure reliability and user satisfaction, touchscreens may be tested exhaustively to determine if touch inputs of an operator are accurately evaluated. Touchscreens also may be tested to determine if the touchscreens are able to withstand myriad applications of (potentially excessive) mechanical force to withstand a lifetime of use.

Exhaustive testing of a touchscreen by actual human operators may require an overwhelming number of manhours. Further, it may be difficult for a human operator to fully and consistently apply touches at various angles and levels of pressure to fully simulate an anticipated lifetime of use; it may be practically impossible for a human operator to consistently repeat such tests to be able to comparatively evaluate different implementations or iterations of a particular touchscreen design. Automated testing using movable, conductive pegs may be able to simulate repeated touches of the touchscreen but may not be able to reasonably simulate how a human finger actually engages the touchscreen at different angles and with varying degrees of mechanical force.

This document describes systems and techniques for simulating the touch of a human finger in manipulating an interface device, such as a touchscreen included in a mobile phone or other computing device. The systems and techniques include an artificial finger configured to be received and manipulated by a robotic actuator to simulate surface engagement, mechanical force, and electrical conductivity of a human finger engaging the touchscreen at varied touch angles and/or mechanical pressures. The systems and techniques thereby provide for rigorous and repeatable testing of an electrical and mechanical response of the touchscreen to simulated user inputs without involving a human test operator.

For example, an apparatus is described that comprises an artificial finger including a rigid central member extending in a first direction and including a curvature transverse to the first direction to approximate phalanges of an extended human finger. A compressible outer layer is disposed around at least a portion of the rigid central member and is shaped to approximate a form of the extended human finger and includes a conductive element spanning at least a distal pad and a tip of the artificial finger. A coupling is joined with the artificial finger and is configured to be received by a robotic actuator to enable the robotic actuator to mechanically manipulate the artificial finger and to electrically couple the conductive element with a conductive portion of the robotic actuator. For another example, a method of forming the previously-described apparatus is disclosed.

This document describes systems and techniques for simulating the touch of a human finger in manipulating an interface device, such as a touchscreen included in a mobile phone or other computing device, through the use of an artificial finger.

Example Systems

Figure 1:
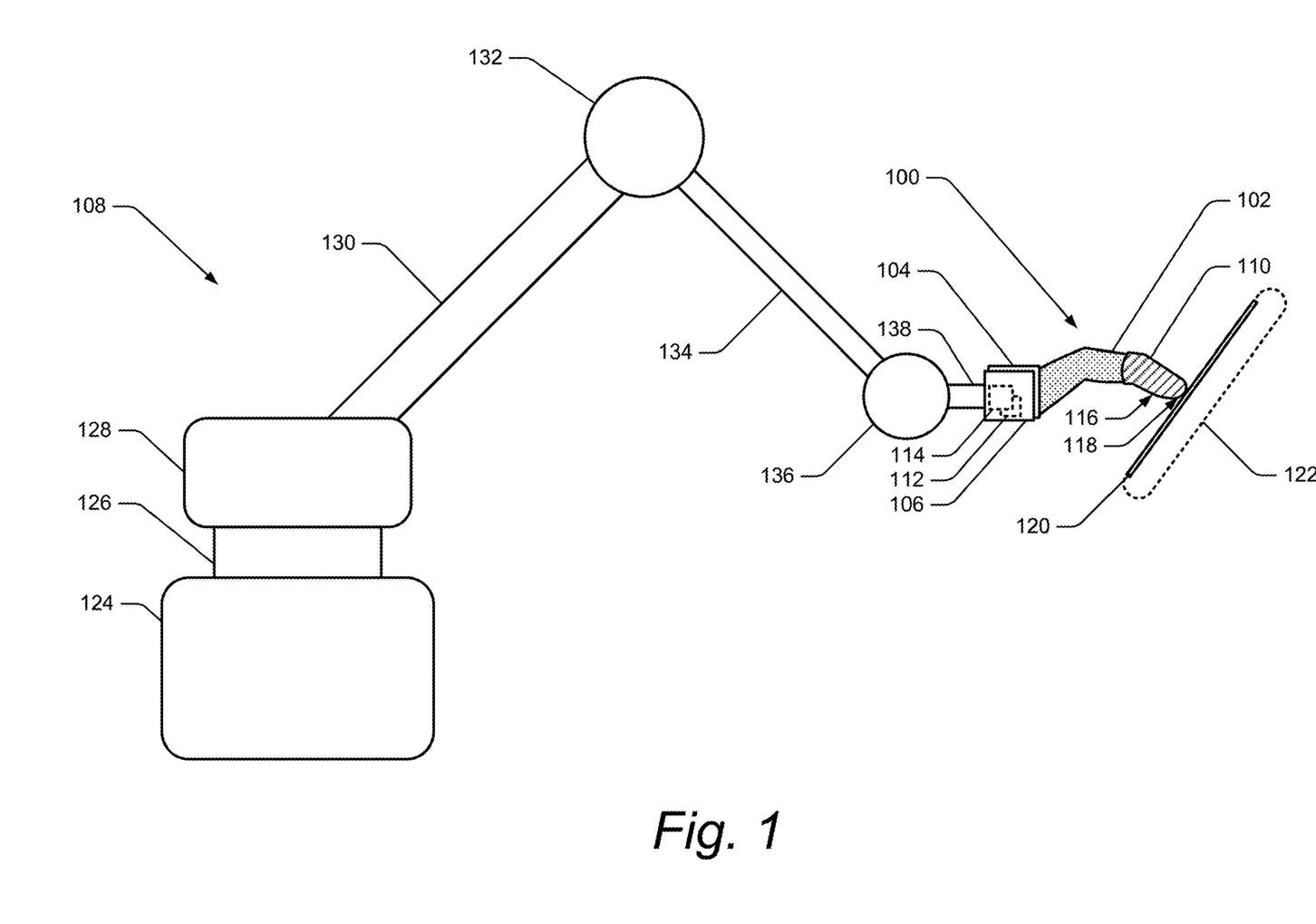
FIG. 1 is a schematic diagram of a manipulation simulator including an artificial finger received by a robotic manipulator.

FIG. 1 illustrates a device 100 that includes an artificial finger 102 joined with or extending from a coupling 104. The coupling 104 is received by a socket 106 of a robotic manipulator 108. A conductive element 110 is positioned on or joined with the artificial finger 102. The conductive element 110 is electrically coupled via a contact 112 on the coupling 104 with a contact 114 of the socket 106 to provide an electrical connection between the conductive element 110 and the robotic manipulator 108. The robotic manipulator 108 will be coupled with electrical ground when in operation. By being electrically coupled with ground (not shown) via the robotic manipulator 108, the conductive element 110 may present electrical properties of a human body. In various implementations, the conductive element 110 is joined with, integrated with, or covering at least a distal pad 116 and a tip 118 of the artificial finger 102 to represent the part of a human finger that typically interacts with a touchscreen 120. The touchscreen 120 may represent an interface of a device 122. The device 122 is shown in dotted lines because the touchscreen 120 may be tested or used without actually being included in a particular device. As described further below, the robotic actuator 108 manipulates the coupling 104 and, thus, the artificial finger 102 to engage the touchscreen 120 to test a responsiveness of the touchscreen 120 to simulated inputs presented by the artificial finger 102 of the device 100.

The robotic actuator 108 is provided merely by way of an example of a system that may be used to manipulate the device 100 to engage the touchscreen 120. The robotic actuator 108 includes a base 124, a waist 126, and a shoulder 128. The waist 126 is configured to rotate in a horizontal plane and the shoulder 128 is configured to rotate in a transverse plane to enable side-to-side and up-and-down movements, respectively. The shoulder 128 supports a first arm segment 130 that is rotatably mounted to the shoulder 128. The first arm segment 130 is rotatably joined with an elbow 132 that, in turn, is rotatably joined with a second arm segment 134. The shoulder 128, the first arm segment 130, the elbow 132, and the second arm segment 134 may be manipulated individually and collectively to extend and/or rotate in the transverse plane just as a human arm may extend and rotate at a shoulder joint. The second arm segment 134 may be further rotatably joined with a wrist joint 136 that supports a wrist element 138 that ends in the socket 106. The wrist joint 136 may enable the wrist element 138 to rotate axially and/or orthogonally relative to the wrist joint 136, resulting in corresponding movements of the artificial finger 102 as it engages the touchscreen 120.

Thus, the robotic manipulator 108 may move the artificial finger 102 to engage the touchscreen 120 at different locations, at different angles—vertically, horizontally, and diagonally relative to the touchscreen 120—and at different mechanical pressures to test responsiveness of the touchscreen 120 to the simulated human touch provided by the artificial finger 102, as described below with reference to FIGS. 3A-3D and FIGS. 4A and 4B. Different actuators may be used to support and manipulate the device 100 to engage the touchscreen 120; the robotic actuator 108 is provided merely by way of example to illustrate how the device 100 may be manipulated to engage the touchscreen 120.

Figure 2A:
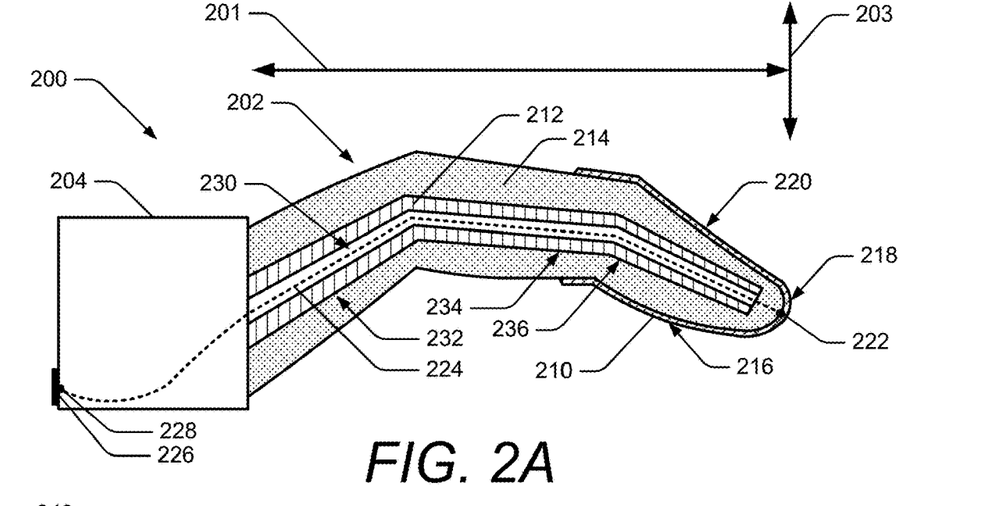
FIGS. 2A-2C are cross-sectional diagrams of implementations of an artificial finger.
Figure 2B:
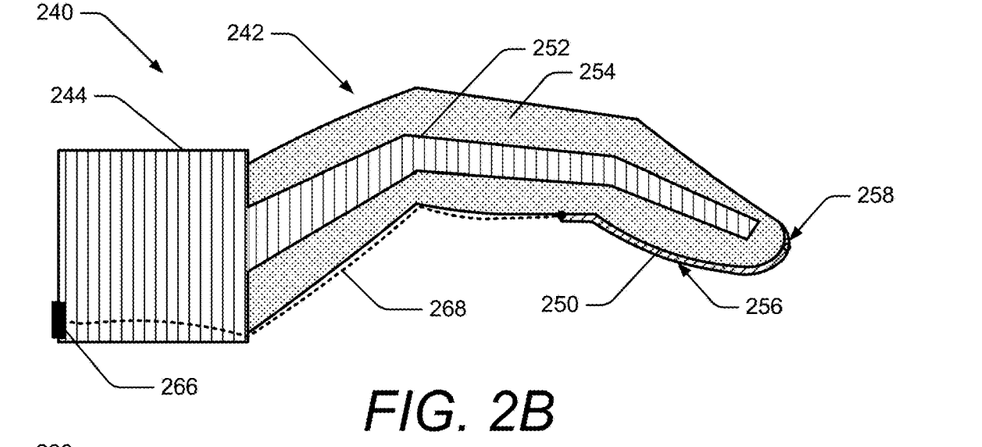
Figure 2C:
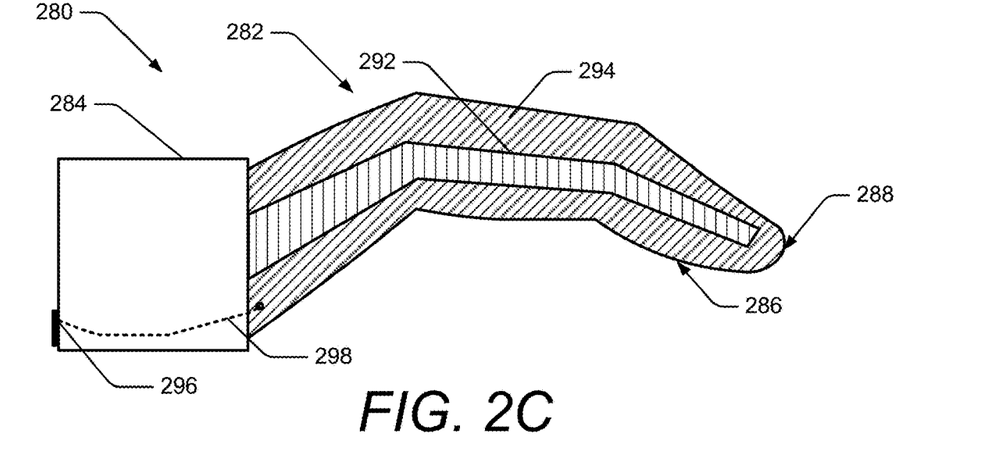

FIGS. 2A-2C illustrate different implementations 200, 240, and 280, respectively, of the device 100 (see FIG. 1). Referring particularly to FIG. 2A, a device 200 includes an artificial finger 202 joined to a coupling 204 and including a conductive element 210 that will engage the touchscreen 120, as previously described. The artificial finger 202 includes a rigid central member 212 and a compressible outer layer 214. By analogy, the rigid central member 212 constitutes the bones or skeletal structure of the artificial finger 202 and the compressible outer layer 214 constitutes the tissue, such as the muscles and flesh, of the artificial finger 202.

In various implementations, the rigid central member 212 may be adhesively joined with the coupling 204 or otherwise mechanically joined or fastened to the coupling 204. As previously described, the coupling 204 is formed to be mechanically received by the socket 106 of the robotic actuator 108 so that the robotic actuator 108 can physically manipulate the artificial finger 202 toward, against, and around the touchscreen 120. The rigid central member 212 generally extends in a first direction 201 and includes a curvature in a transverse direction 203. It will be appreciated that this configuration approximates phalanges of a human finger extended in the first direction 201 and having a natural curvature and a capacity to flex in the transverse direction 203. The rigid central member 212, for example, may be formed of a material including an International Organization for Standardization (ISO) 48 hardness scale Type D material to present a rigid structure like human bone.

The compressible outer layer 214 covers or encapsulates the rigid central member 212, just as flesh of a human finger covers or encapsulates bones of the human finger. As a result, when the device 200 is manipulated to engage the touchscreen 120, it engages the touchscreen 120 as a human finger might: the artificial finger 202 flexes in the transverse direction 203 and the compressible outer layer 214, when pressed against the touchscreen 120, presents an expanding "fingerprint," as further described with reference to FIGS. 3A-3D and FIGS. 4A and 4B. The compressible outer layer 214, for example, may be formed of a second material including an ISO 48 hardness scale Type A material to present a compressible structure like flesh of a human finger.

The conductive element 210, when electrically coupled with the robotic actuator 108 as previously described, simulates the electrical properties of a human finger. In various implementations, such as shown in FIG. 2A, the conductive element 210 includes a covering disposed over a distal pad 216 and tip 218 of the artificial finger 202, those areas of the artificial finger 202 that are most likely to interact with the touchscreen 120. The conductive element 210 also may extend over a top 220 of the artificial finger 202 to support securing the conductive element 210 to the artificial finger 202. If desired, the conductive element 210 over the top 220 of the artificial finger 202 may be used to test the touchscreen 120 in response to a touch with the top 220 of the artificial finger 202. In various implementations, the conductive element 210 may include a conductive material, such as graphene or carbon nanotubes, to provide electrical properties that simulate those of a human finger.

The conductive element 210 is electrically joined, such as at an electrical connection point 222, with an electrical conductor 224. The electrical conductor 224, in turn, is joined with an electrical conductor that electrically couples the conductive element 210 with the robotic actuator 108. In various implementations, the electrical conductor 224 is joined with a contact 226 on the coupling 204 at an electrical connection point 228. As described with reference to FIG. 1, the contact 226 on the coupling 204 is configured to be received by the contact 114 on the socket 106 (see FIG. 1) so that, when the device 200 is received within the socket 106 of the robotic actuator 108, the device 200 is mechanically and electrically coupled with the socket 106 and the rest of the robotic actuator 108. Alternatively, instead of providing a separate contact 226 on the socket 204, the electrical conductor 224 could be wrapped around an end of or threaded through an opening in the socket 204 so that an end of the electrical conductor 224 is presented against the contact 114 or another conductive portion of the socket 106.

In various implementations, the electrical conductor 224 extends through an interior channel 230 molded or otherwise formed within the rigid central member 212. The electrical conductor 224 thus extends from the conductive element 210 to the electrical contact 226 on the coupling 204 internally through the artificial finger 202.

In various implementations, the artificial finger 202 is configured to be at least partially deflectable in the transverse direction 203 to simulate flexing of a human finger when pressed against an object, such as the touchscreen 120, as further described below with reference to FIGS. 4A and 4B. The artificial finger 202 may be configured in various degrees to accurately simulate the shape of a human finger. For example, the rigid central member 212 may include a proximal section 232, a medial section 234, and a distal section 236 to simulate proximal, medial, and distal phalanges, respectively, of a human finger to simulate how a human finger may flex when pressed against the touchscreen 120 by the robotic manipulator 108. Correspondingly, the compressibility of the compressible outer layer 214 simulates how a pad or tip of a finger expands against a surface depending on the pressure applied by the finger. Finally, the conductive element 210, electrically coupled to the robotic manipulator 108, simulates the capacitance and other electrical properties of a finger. Thus, by moving the device 200, the robotic manipulator 108 may move the artificial finger 202 against the touchscreen 120 to simulate human touches of the touchscreen 120.

Other implementations of an artificial finger may provide the same or similar mechanical and electrical properties as the device 200 using different configurations. For example, FIG. 2B shows a device 240 including an artificial finger 242 that varies from the device 200 and the artificial finger 202 in three respects. First, a coupling 244 is integrally formed with a rigid central member 252, such as in a single molding or three-dimensional printing step. In other words, instead of joining or attaching the rigid central member 252 to the coupling 244, the rigid central member 252 and the coupling 244 are formed as a single component.

Second, the rigid central member 252 does not include an interior channel 230 (see FIG. 2A) like the device 200. Rather, instead of a conductive element 250 being electrically coupled by an electrical conductor 268 to a contact on the coupling 244 by passing through an interior channel, the electrical conductor 268 passes along or in a surface of the artificial finger 242. The electrical conductor 268 is electrically coupled to the conductive element 250 at one end and extends along or within a surface of a compressible outer layer 254 to or through the coupling 244 where a bent portion 266 of the electrical conductor 268 along a side of the coupling 244 provides an electrical contact electrically couplable with the contact 114 or another conductive portion of the socket 106 (see FIG. 1).

Third, the conductive element 250 does not cover an entire end of the artificial finger 242 like the conductive element 210 of the device 200 of FIG. 2A. The conductive element 250 covers a distal pad 256 and a tip 258 of the artificial finger 242 without also covering a top of the artificial finger 242 the way that the conductive element 210 also covers the top 220 of the artificial finger 202 of FIG. 2A. The conductive element 250 may be adhesively or thermally attached to the compressible outer layer 254 of the artificial finger 242 to hold the conductive element 250 in place.

Referring to FIG. 2C, a device 280 includes an artificial finger 282 having a rigid central member 292 attached to (as in the device 200 of FIG. 2A) or integrally formed with (as in the device 240 of FIG. 2B) a coupling 284. The rigid central member 292 is covered or encased in a compressible outer layer 294, as in the other devices 200 and 240 of FIGS. 2A and 2B, respectively. By contrast to the devices 200 and 240 of FIGS. 2A and 2B, the compressible outer layer 294 is comprised of a conductive material, such as graphene, or includes a compressible binder impregnated with a conductive material, allowing the compressible outer layer 294 to also serve as a conductive element. The compressible outer layer 294 is electrically coupled with a contact 296 on the coupling 284 with an electrical conductor 298. The conductive compressible outer layer 294 presents a conductive surface at a distal pad 286 and a tip 288 of the artificial finger 282; thus, no separate conductive element is used in the device 280.

It should be appreciated that the variations between the devices 200, 240, and 280 may be combined in any desired combination; implementations of the devices 200, 240, and 280 are not limited to the combinations as described with reference to FIGS. 2A-2C.

Examples of Use

Figure 3A:
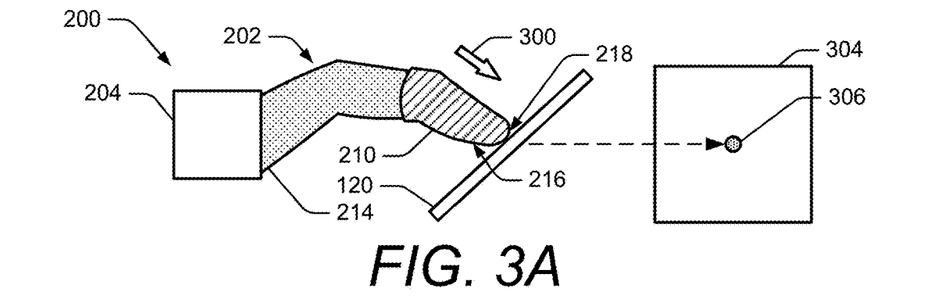
FIGS. 3A-3D are schematic diagrams of the artificial finger of FIG. 1 being manipulated to test conductive engagement of a touchscreen.
Figure 3B:
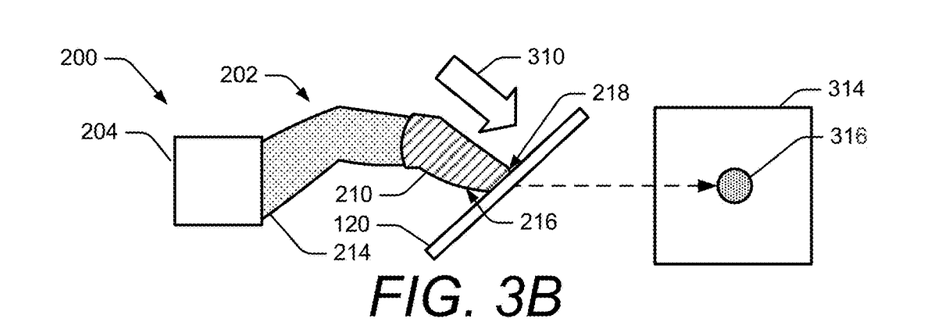
Figure 3C:
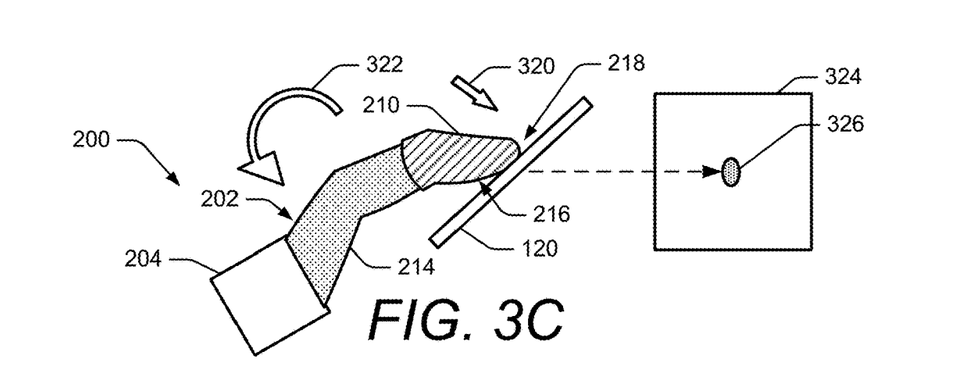
Figure 3D:
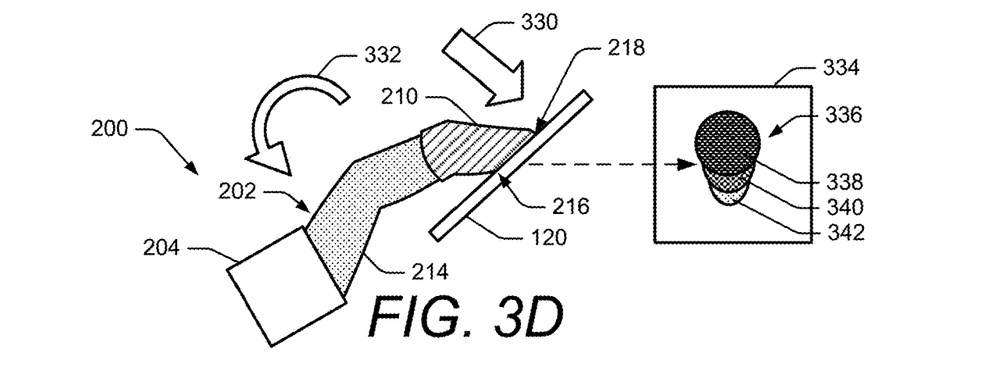
Figure 4A:
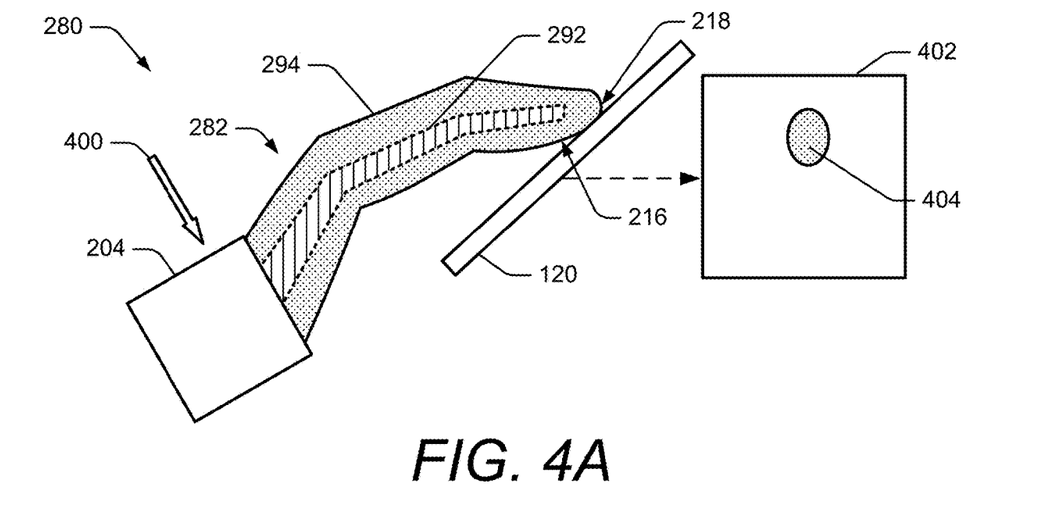
FIGS. 4A and 4B are schematic diagrams of the artificial finger of FIG. 1 being manipulated to test physical strength of a touchscreen.
Figure 4B:
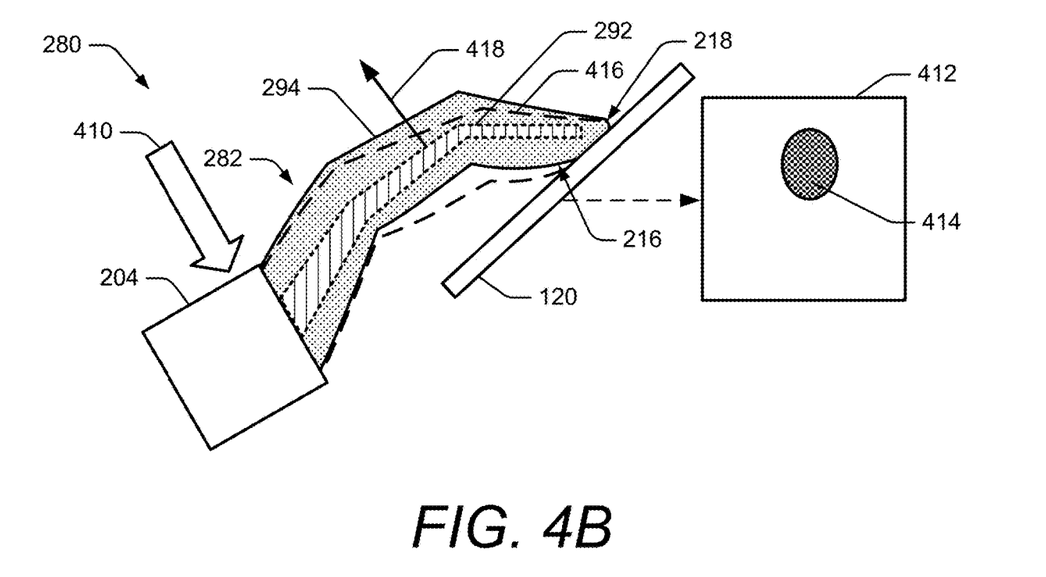

FIGS. 3A-3D and 4A and 4B illustrate examples of how implementations of the device 200 may interact with the touchscreen 120 and digitizer outputs of the touchscreen 120 resulting from the interactions. As previously described, it should be assumed that the robotic manipulator 108 (not shown in FIGS. 3A-3D and FIGS. 4A and 4B) or a similar actuator motivates the device 200 and provides electrical conductivity so that the artificial finger 202 presents electrical properties to simulate the touch of a human finger. For illustration, the examples of FIGS. 3A-3D depict use of the device 200 of FIG. 2A, while the examples of FIGS. 4A and 4B depict use of the device 280 of FIG. 2C. However, the devices 200 and 280 could be interchanged and/or the device 240 of FIG. 2B or other implementations of the artificial finger also could be used in these examples. As is commonly understood, touchscreens commonly include digitizers to detect a location and a nature of contact with touchscreens such as the touchscreen 120.

FIG. 3A shows the device 200 pressed against the touchscreen 120 at a light pressure represented by a small arrow 300. Applying the light pressure 300 to the device 200 causes the artificial finger 202 to impinge upon the touchscreen 120 at the same light pressure 300. Because the light pressure 300 is applied, the outer compressible layer 214 of the artificial finger 202 is only compressed to a small degree, resulting in only a small portion of the conductive element 210 at the tip 218 of the artificial finger 202 being pressed against the touchscreen 120. A resulting digitizer output 304 shows a small contact area 306 corresponding to the tip 218 of the artificial finger 202 engaging the touchscreen at the light pressure 300.

FIG. 3B shows the device 200 pressed against the touchscreen 120 at a higher pressure represented by a larger arrow 310. Applying the higher pressure 310 to the device 200 causes the artificial finger 202 to impinge upon the touchscreen 120 at the higher pressure 310. Because the higher pressure 310 is applied, the outer compressible layer 214 of the artificial finger 202 is compressed to a greater degree against the touchscreen 120. As a result, the outer compressible layer 214 expands where the artificial finger 202 contacts the touchscreen 120. Expansion of the artificial finger 202 against the touchscreen 120 forces a larger portion of the conductive element 210 at the tip 218 of the artificial finger 202 to be pressed against the touchscreen 120. A resulting digitizer output 314 shows a larger contact area 316 corresponding to the tip 218 of the artificial finger 202 being pressed against the touchscreen at the higher pressure 310. Pressing a human finger at a higher pressure against the touchscreen would similarly yield a resulting digitizer output showing a larger contact area as a result of the touch being applied at a greater pressure. Thus, in contrast to engaging the touchscreen 120 with a conductive pin, the configuration of the device 200 mimics the human finger in that touches of varying pressure result in the touchscreen 120 yielding differently sized digitizer readings.

FIG. 3C shows the device 200 being pressed against the touchscreen 120 at a low pressure represented by a small arrow 320, but also with a moment, represented by a curved arrow 322, being applied to the device 200 to cause the artificial finger 202 to twist relative to a surface of the touchscreen 120. The moment 322 results in the touchscreen 120 being impinged upon by the artificial finger 202 at an oblique angle, resulting in the distal pad 216 of the artificial finger 202 pressing against the touchscreen 120. The pressing of the distal pad 216 against the touchscreen 120 yields a resulting digitizer output 324 including an elliptical contact 326, such as may be presented by a human fingerprint. Again, by contrast with using a conductive pin to engage the touchscreen 120, which would include a circular contact, using the artificial finger 202 yields an input that is more representative of human interaction with the touchscreen 120.

FIG. 3D shows the device 200 being pressed against the touchscreen 120 at a greater pressure represented by a larger arrow 330 and also with a greater moment 332 as compared with the pressure 320 and moment 322 of the example of FIG. 3C. Resulting twisting of the artificial finger 202 to an oblique angle results in the distal pad 216 of the artificial finger 202 pressing against the touchscreen 120 at varying degrees of pressure along a surface of the distal pad 216.

A resulting digitizer output 334 includes a contact 336 that, for the sake of explanation, represents a series of first, second, and third overlapping contacts 338, 340, and 342 at varied degrees of pressure. The first overlapping contact 338 from the distal pad 216 closest to the tip 218 is at a greatest pressure (a magnitude of pressure is represented by a fill pattern of decreasing density between the overlapping contacts 338, 340, and 342). As a result of the greater pressure, the compressible outer layer 214 and, in turn, the conductive element 210 are more greatly compressed against the touchscreen 120. Because of the moment 332, the pressure between the artificial finger 202 and the touchscreen 120 is greatest at the most distal point at which the artificial finger impinges upon the touchscreen 120. Thus, the first overlapping contact 338 is of a larger size than the other overlapping contacts 340 and 342. The second overlapping contact 340 is applied at a lesser pressure and, thus, has a slightly lesser size. The third overlapping contact 342 is at a lowest pressure and, thus, of a further lesser size. The contact 336 and the range of pressures and size of the of the artificial finger 202 are such as may be presented by a human finger. Again, by contrast with using a conductive pin to engage the touchscreen 120, which would include a circular contact of uniform pressure, the compressible outer layer 214 of the artificial finger 202 yields an input of varying pressure and size of impingement that may be more representative of actual human interaction.

FIGS. 4A and 4B depict flexing of the artificial finger 282 (in addition to compression of the artificial finger 202 as previously described with reference to FIGS. 3A-3D) of the device 280 as a result of its engagement with the touchscreen 120. FIG. 4A shows the device 280 pressed against the touchscreen 120 at a light pressure 400. Applying the light pressure 400 to the device 280 causes the artificial finger 282 to impinge upon the touchscreen 120 at the light pressure 400. In response to the engagement at the light pressure 400, the conductive compressible outer layer 294 (obviating inclusion of a separate conductive element) of the artificial finger 282 is compressed against the touchscreen 120 to a small degree. A resulting digitizer output 402 shows a small, elliptical contact area 404 corresponding to portions of the distal pad 216 and the tip 218 of the artificial finger 282 engaging the touchscreen at the light pressure 400.

FIG. 4B shows the device 280 pressed against the touchscreen 120 at a greater pressure 410. Applying the greater pressure 410 to the device 280 causes the artificial finger 282 to impinge upon the touchscreen 120 at the greater pressure 410. The greater pressure 410 not only causes the compressible outer layer 294 to compress and to expand against the touchscreen 120 but also causes the rigid central member 292 to flex in response to the contact with the touchscreen 120, as previously described with reference to FIGS. 2A-2C.

In response to the engagement at the higher pressure 410, the compressible layer 294 of the artificial finger 282 is compressed against the touchscreen 120 to a greater degree (as compared to the example of FIG. 4A). A resulting digitizer output 412 shows a larger, elliptical contact area 414 corresponding to portions of the distal pad 216 and the tip 218 of the artificial finger 282 engaging the touchscreen at the greater pressure 410 (with a fill pattern of greater density representing the greater pressure detected in the digitizer output 412). Further, in response to the impingement of the artificial finger 282 on the touchscreen 120, the artificial finger 282 flexes away from the touchscreen 120, from a previous positioning 416 of FIG. 4A (shown in dashed lines in FIG. 4B) and in a direction 418. In response to the impingement against the touchscreen 120 at the greater pressure 410, the rigid central member 292 of the artificial finger 282 flexes away from the touchscreen 120 in the direction 418, allowing the rest of the artificial finger 282 to flex away from the touchscreen 120. Thus, the flexibility of the rigid central member 292, as well as the compressibility of the compressible outer layer 294, mimics the skeletal structure and flesh of a human finger to allow for realistic simulation of a human touch in testing the touchscreen 120.

Example of Formation of the Device

The devices 200, 240, and 280 of FIGS. 2A-2C may be formed by molding or sculpting the rigid central members 212, 252, and 292, respectively, injection molding the compressible outer layers 214, 254, and 294, respectively, and in any number of ways. For the sake of illustration, FIGS. 5A-5E depict production of the device 200 using three-dimensional (3D) printing to form the rigid central member 212 and the compressible outer layer 214 as part of the production process.

Figures 5A, 5B:
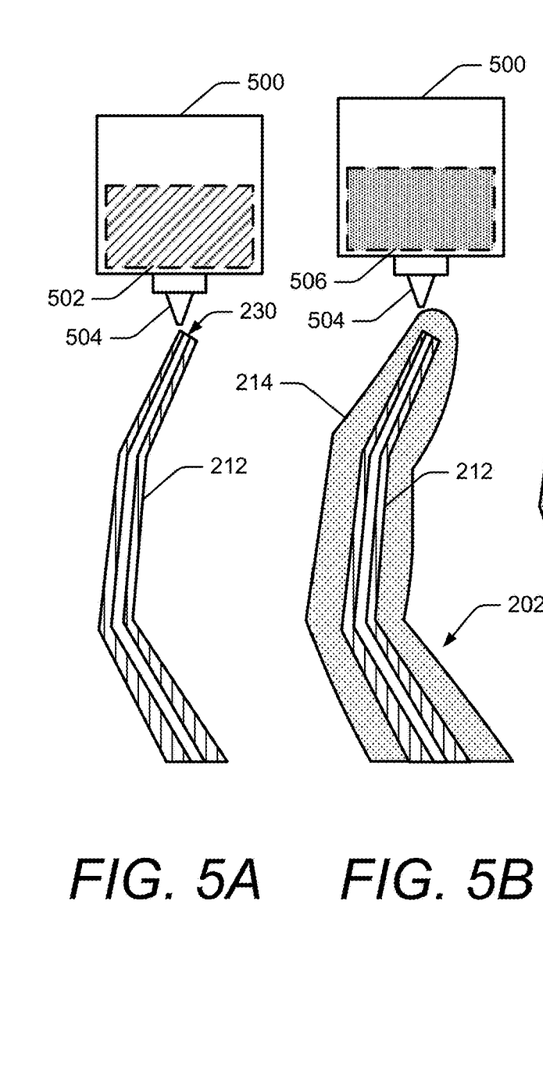
FIGS. 5A-5E are cross-sectional diagrams of formation of the artificial finger of FIG. 2A.

FIG. 5A shows a 3D printer 500 depositing a first material 502 via a nozzle 504 to form the rigid central member 212. As previously described, the first material 502 may be of an ISO 48 hardness scale Type D material. The 3D printing technique may include selective laser sintering (SLS) 3D printing, fused deposition modeling (FDM) 3D printing, or stereolithography (SLA) 3D printing to "print" both the rigid central member 212 and the compressible outer layer 214 with different printing devices, or, in the case of SLS 3D printing, the 3D printer 500 can use multiple materials to print the artificial finger 202 in a single step. The compressible outer layer 214, as previously described, may be formed of ISO 48 hardness scale Type A material. Thus, referring to FIG. 5B, the compressible outer layer 214 may be printed or deposited by an SLS 3D printer 500 to also deposit a second material 506 via the nozzle 504, or the compressible outer layer 214 may be deposited over the rigid central member 212 in a second step of 3D printing.

Figures 5A, 5C, 5D, 5E:
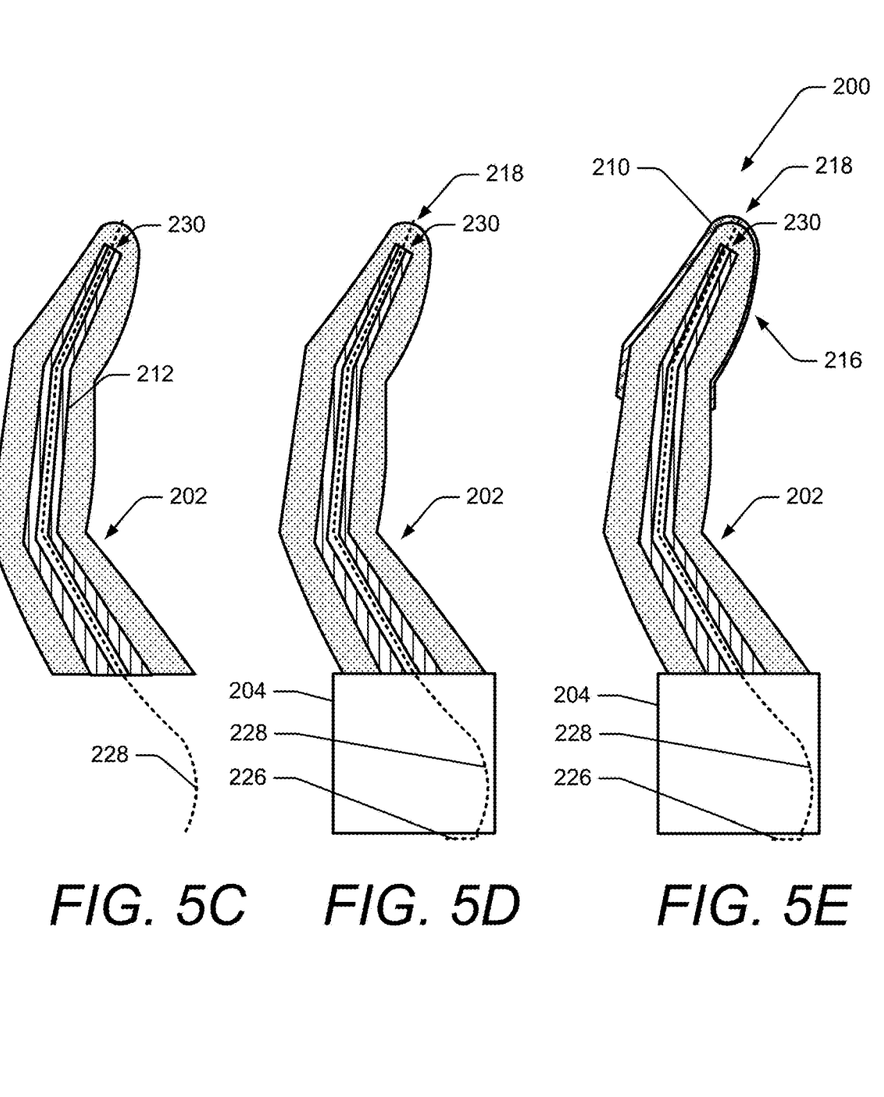

FIG. 5C shows the electrical conductor 228 being threaded through the interior channel 230 of the rigid central member 212. As previously described, however, other forms of the devices 240 and 280 of FIGS. 2B and 2C may connect the electrical conductors 268 and 298, respectively, without the inclusion or use of the interior channel 230. It also should be appreciated that the rigid central member 212 could be printed or molded around the electrical conductor 228.

FIG. 5D shows the artificial finger 202 joined to the coupling 204. The electrical conductor 228 is passed through or around the coupling 204, and the electrical conductor 228 is joined with or is configured to present the electrical contact 226 on the coupling 204 to electrically engage a manipulating device, such as the robotic actuator 108 (see FIG. 1). As previously described, the coupling 204 may also be formed integrally with the rigid central member 212 if desired.

FIG. 5E shows the conductive element 210 installed upon the distal pad 216 and the tip 218 of the artificial finger 202 and electrically connected with the electrical conductor 228. The conductive element 210 may be formed by molding or 3D printing the conductive element 210 using graphene or another conductive material. The completed device 200 is usable by the robotic actuator 108 or another manipulator to perform testing of the touchscreen 120 or other operations where its simulated human touch may be useful.

Figure 6:
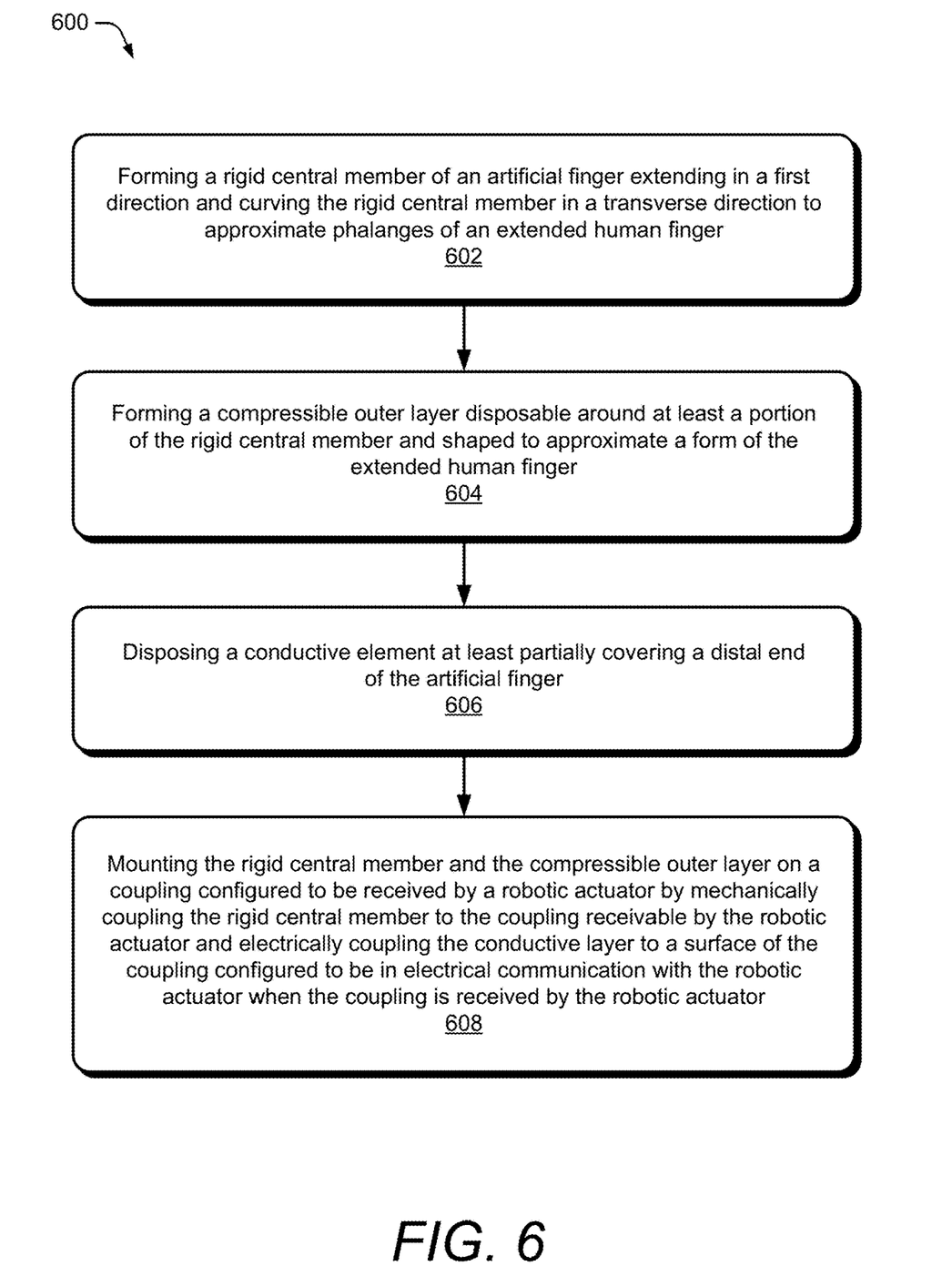
FIG. 6 is a flow diagram of an example method of forming the artificial finger of FIG. 1.

FIG. 6 illustrates an example method 600 of forming the device 200 of FIG. 2A as described with reference to FIGS. 5A-5E. At a block 602, a rigid central member 212 of an artificial finger 202 extending in the first direction 201 and curving the rigid central member 212 in a transverse direction 203 to approximate phalanges of an extended human finger is formed using 3D printing as described with reference to FIG. 5A or by another method. At a block 604, a compressible outer layer 214 disposable around at least a portion of the rigid central member 212 and shaped to approximate a form of the extended human finger is also formed by using 3D printing as described with reference to FIG. 5B or by another method. At a block 606, a conductive element 210 at least partially covering a distal end of the artificial finger 202 is disposed on the artificial finger 202 as described with reference to FIG. 5C or by another method. At a block 608, the rigid central member 212 and the compressible outer layer 214 are mounted on a coupling 204 configured to be received by a robotic actuator 108 (FIG. 1). Mounting the rigid central member 212 and the compressible outer layer 214 includes mechanically coupling the rigid central member 212 to the coupling 204 receivable by the robotic actuator 108 and electrically coupling the conductive element 210 to a surface of the coupling 204 configured to be in electrical communication with the robotic actuator 108 when the coupling 204 is received by the robotic actuator 108, as described with reference to FIGS. 5C-5E.

The preceding discussion describes systems and techniques for simulating the touch of a human finger in manipulating an interface device, such as a touchscreen included in a mobile phone or other computing device. The systems and techniques include an artificial finger configured to be received and manipulated by a robotic actuator to simulate surface engagement, mechanical force, and electrical conductivity of a human finger engaging the touchscreen at varied touch angles and/or mechanical pressures. The systems and techniques thereby provide for rigorous and repeatable testing of an electrical and mechanical response of the touchscreen to simulated user inputs without involving a human test operator. These systems and techniques may be realized using one or more of the entities or components shown in FIG. 1 and FIGS. 2A-2C, formed as shown in FIGS. 5A-5E and FIG. 6, and used as described with reference to FIGS. 3A-3D and FIGS. 4A and 4B. Thus, these figures illustrate some of the many possible systems capable of employing the described techniques.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although implementations of systems and techniques for simulating the touch of a human finger in manipulating an interface device, such as a touchscreen, have been described in language specific to certain features and/or methods, the subject of the appended claims is not necessarily limited to the specific features or methods described. Rather, the specific features and methods are disclosed as example implementations of systems and techniques for simulating the touch of a human finger in manipulating an interface device, such as a touchscreen.

What is claimed is:
1. An apparatus comprising:
   an artificial finger including:
      a rigid central member extending in a first direction, including a curvature in a transverse direction to approximate phalanges of an extended human finger, and defining an interior channel configured to receive an electrical conductor configured to electrically couple a conductive element with a coupling; and a compressible outer layer disposed around at least a portion of the rigid central member and shaped to approximate a form of the extended human finger and including the conductive element, the conductive element spanning at least a distal pad and a tip of the artificial finger; and the coupling, the coupling joined with the artificial finger and configured to be received by a robotic actuator to enable the robotic actuator to mechanically manipulate the artificial finger and to electrically couple the conductive element with a conductive portion of the robotic actuator.

2. The apparatus of claim 1, wherein the rigid central member is configured to be partially deflectable in the transverse direction.

3. The apparatus of claim 1, wherein the rigid central member is formed of a first material including an International Organization for Standardization (ISO) 48 hardness scale Type D material.

4. The apparatus of claim 1, wherein the compressible outer layer is formed of a second material including an International Organization for Standardization (ISO) 48 hardness scale Type A material.

5. The apparatus of claim 1, wherein the conductive element includes the conductive material, the conductive material including graphene or carbon nanotubes.

6. The apparatus of claim 1, wherein the conductive element:

includes a covering disposed over the distal pad and the tip of the artificial finger; or is integrated into the compressible outer layer of the artificial finger.

7. The apparatus of claim 1, wherein at least one of the rigid central member and the compressible outer layer is formed using three-dimensional (3D) printing.

8. The apparatus of claim 7, wherein at least one of the rigid central member and the compressible outer layer is formed using selective laser sintering (SLS) 3D printing, fused deposition modeling (FDM) 3D printing, or stereolithography (SLA) 3D printing.

9. The apparatus of claim 1, wherein the coupling includes the electrical conductor electrically coupled to the conductive element and extending to an electrical contact on the coupling, the electrical contact on the coupling configured to engage the conductive portion of the robotic actuator.

10. The apparatus of claim 1, further comprising:

the robotic actuator, the robotic actuator having a socket into which the coupling is received.

* * * * *